(No Model.)
J. F. ROBINSON & C. W. GOUERT.
CURTAIN SUPPORT.
No. 376,911. Patented Jan. 24, 1888.
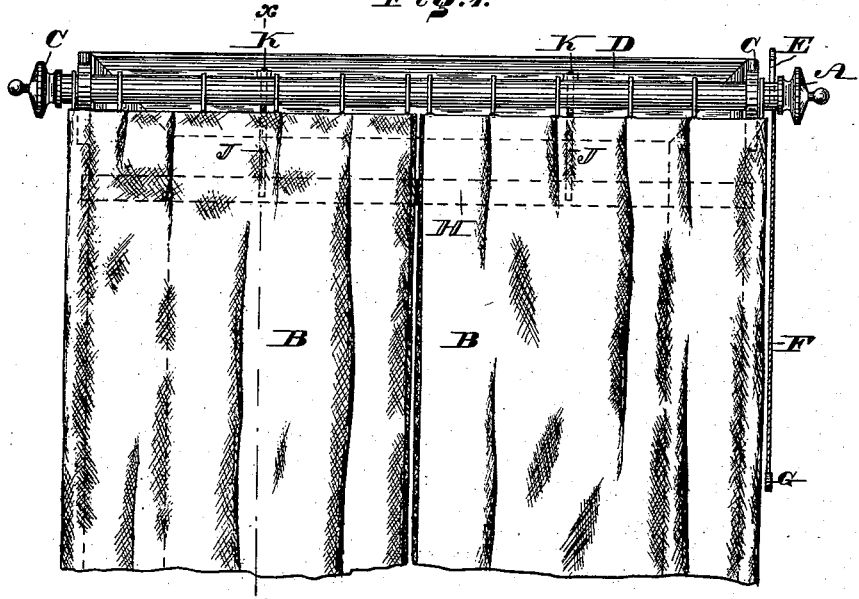
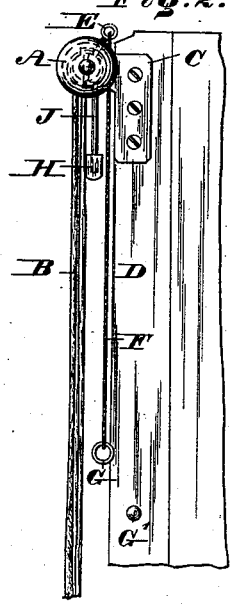
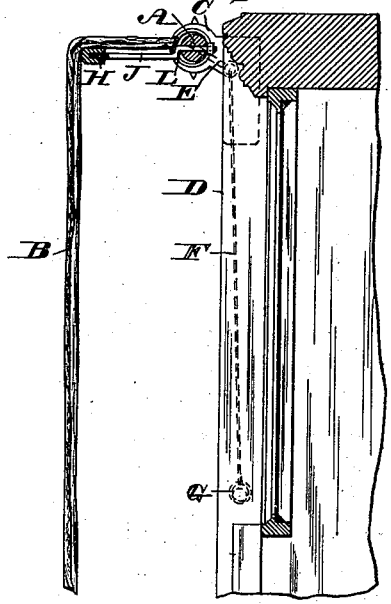
WITNESSES:
Th. Rollé
James F. Kelly
INVENTORS:
John F. Robinson
Charles W. Gouert
BY Diederichsen & Küttner
ATTORNEYS.

UNITED STATES PATENT OFFICE.

JOHN F. ROBINSON AND CHARLES W. GOUERT, OF NEW CASTLE, DELAWARE.

CURTAIN-SUPPORT.

SPECIFICATION forming part of Letters Patent No. 376,911, dated January 24, 1888.

Application filed September 5, 1887. Serial No. 248,851. (No model.)

*To all whom it may concern:*

Be it known that we, JOHN F. ROBINSON and CHARLES W. GOUERT, citizens of the United States, residing at Wilmington, in the county of New Castle, State of Delaware, have invented a new and useful Improvement in Curtain-Supports, which improvement is fully set forth in the following specification and accompanying drawings.

Our invention has for its object the protection of curtains while opening shutters or windows over which they are hung.

To this end the invention consists of means for throwing or setting out the curtain in order to clear the shutters or window-frame.

Figure 1 represents a front view of a curtain support embodying our invention. Fig. 2 represents an end elevation thereof. Fig. 3 represents a section in line $xx$, Fig. 1, the parts being in different positions.

Similar letters of reference indicate corresponding parts in the several figures.

Referring to the drawings, A represents a pole, from which depend the curtains B, said pole being journaled on the eyes or brackets C, which latter are secured to the window-frame D, said pole, as is evident, being capable of rotation on said brackets.

To the end of the pole is secured a crank-arm, E, radiating therefrom, and having attached to it a cord, F, which is convenient of access from the floor of the apartment, and provided at its lower end with a ring, G, which may be fitted on a pin, nail, or screw, G', on the side of the window-frame.

Connected with the pole A is a bar or rod, H, which is parallel with the rod A and secured thereto by arms or screw-bolts J and nuts K, said arms radiating from the pole A, and having one end fastened to the bar H and the other end passed through the pole A and tightened thereon by means of the nuts K.

In order to provide a firm connection of the arms J with the pole, they are bent or turned near their ends, forming shoulders L, which abut against the pole opposite to the nuts K, preventing the arms from loosening or slipping.

The arms J may be similarly shouldered on the inner side of the bar H, in order to increase the strength of the connection of said parts, it being desirable to form the arms and bar of light material, and hence provide stability for the same. When the parts are in their normal position, the bar H depends from the pole A or projects downwardly, and the curtain hangs over the pole, as usual, without being in any way affected by said bar.

When it is desired to open or close the shutters or window, or for any other purpose have access thereto, the cord F is drawn, whereby, owing to the crank-arm E, the pole is rotated, and the bar H, following the same to the front, bears against the curtains and sets them out from the window, so that an increased space exists between the curtains and window, permitting the person to pass behind the curtain and have access to the shutters and window for opening and closing the same, or other purposes, without injury or otherwise affecting the curtains or being interfered with by the same.

In order to restore the curtains to their normal position, the cord F is released or let go, and the pole makes a quarter-turn, placing the bar lowermost and allowing the curtains to drop.

In lieu of the crank-arm E, we may use a crank wheel or pulley on the end of the pole, the cord F being wound around said wheel, as shown in Fig. 3.

When the curtains are removed, the bar may also be removed, this being accomplished by unscrewing the nuts K, thus disconnecting the arms J from the pole.

Having thus described our invention, what we claim as new, and desire to secure by Letters Patent, is—

1. A curtain-support consisting of a rotatable pole having fixed bearings and a set-out parallel bar connected with said pole, substantially as described.

2. A rotary curtain-pole, in combination with a parallel bar connected therewith, and means, substantially as described, connected with said pole for rotating the same, substantially as and for the purpose set forth.

3. A curtain-pole suitably journaled and provided with a parallel bar attached thereto, and a crank attached to said pole, said parts being combined substantially as and for the purpose set forth.

4. In a curtain-support, substantially as described, a rotating pole, in combination with a setting-out bar, and arms connecting said bar and pole, as stated.

5. In a curtain-support, a rotary pole, in combination with a setting-out bar, and arms connecting said bar and pole, the arms having the abutting shoulders L, substantially as and for the purpose set forth.

JOHN F. ROBINSON.
CHAS. W. GOUERT.

Witnesses:
JAMES O'NEILL,
GEORGE O'NEILL.